June 2, 1970 R. ROSENBERG ET AL 3,515,887

OPTICAL SCANNER INCLUDING AT LEAST ONE GUNN-EFFECT OSCILLATOR ELEMENT

Filed Nov. 20, 1967 2 Sheets-Sheet 1

INVENTORS R. ROSENBERG
H. J. SCHULTE, JR.
BY
Lucian C. Canepa
ATTORNEY

June 2, 1970 R. ROSENBERG ET AL 3,515,887

OPTICAL SCANNER INCLUDING AT LEAST ONE GUNN-EFFECT OSCILLATOR ELEMENT

Filed Nov. 20, 1967 2 Sheets-Sheet 2

United States Patent Office 3,515,887
Patented June 2, 1970

3,515,887
OPTICAL SCANNER INCLUDING AT LEAST ONE GUNN-EFFECT OSCILLATOR ELEMENT

Robert Rosenberg and Harry J. Schulte, Jr., Fair Haven, N.J., assignors to Bell Telephone Laboratories, Incorporated, Murray Hill, N.J., a corporation of New York Filed Nov. 20, 1967, Ser. No. 684,363
Int. Cl. G02f 1/18; H01j 39/12
U.S. Cl. 250—225 6 Claims

ABSTRACT OF THE DISCLOSURE

A high speed optical scanning apparatus is described. The apparatus includes a Gunn-effect oscillator element and is based on the recognition that the dipole layers propagated within such an element are characterized by unique indices of refraction. A substantial portion of the element is illuminated with incident light of a particular polarization, and an analyzer is positioned on the output side of the wafer to pass only the light whose polarization condition is selectively altered by the layer. As a result, the analyzer transmits a line of light that sweeps or scans an output plane at a constant velocity. By disposing another Gunn-effect element in the path of the line, the apparatus is adapted to interrogate a multicell storage plate in an ordered cell-by-cell manner.

This invention relates to selectively directing radiant energy and more particularly to an apparatus adapted to selectively control an optical beam to scan a multizone information storage area in a systematic zone-by-zone manner.

BACKGROUND OF THE INVENTION

Various systems are known in the optical signal processing art for steering an optical beam to selected points in space. Such a system can, for example, be utilized to read an optical memory plate on which binary information is stored as a pattern of transparent and opaque spots or cells. Whenever the beam is directed at a transparent spot on the plate, a photodetector device behind the plate is excited by the transmitted beam to produce an electrical signal. On the other hand, an interrogated spot that is opaque blocks the beam from reaching the photodetector device. Thus, by scanning the spots in an ordered way, the binary information represented thereby can be read out from the memory plate in a nondestructive way without the need for making physical connections to the individual cells of the plate.

An object of the present invention is the improvement of optical scanning apparatus.

More specifically, an object of this invention is an improved optical scanner characterized by simplicity of design, speed of operation and ease of fabrication.

SUMMARY OF THE INVENTION

These and other objects of the present invention are realized in a specific illustrative embodiment thereof that includes a thin wafer of a bulk semiconductor material such as gallium arsenide. It is known that the application of an appropriate direct-current bias voltage to such a wafer produces high frequency electromagnetic oscillations therein. These so-called Gunn-effect oscillations are generated by the nucleation and constant speed propagation within the wafer of successive narrow dipole layers characterized by extremely high electric fields. This effect is described, for example, in the paper "Instabilities of Current in III–V Semiconductors," by J. B. Gunn, IBM Journal, April 1964.

The aforementioned propagating layers exhibit unique indices of refraction relative to the remainder of the wafer. In accordance with the principles of the present invention, this phenomenon is utilized by illuminating a substantial portion of an entry face of the wafer with incident light of a particular polarization and positioning an analyzer on the output side of the wafer to pass only the light whose polarization condition is selectively altered by the layer. As a result, the analyzer transmits a line of light that sweeps or scans an output plane at a uniform velocity. In the illustrative embodiment, this output plane comprises a storage plate having transparent and opaque memory cells to be scanned. If the plate is considered to store a word of information bits in each of a plurality of rows thereof, it is apparent that vertical scanning of the plate is effective to read out the information stored therein in a word-by-word fashion.

In accordance with another aspect of the principles of the present invention, the aforedescribed illustrative embodiment is modified to include an additional Gunn-effect wafer. This additional wafer is disposed in the path of the line of light transmitted by the first wafer and its associated analyzer. Furthermore, the second wafer is oriented to propagate dipole layers in a direction perpendicular to the direction in which the noted incident line sweeps. An analyzer is positioned on the output side of the second wafer to pass only those successive portions of the line of light whose polarization condition is selectively altered by the propagating layers in the second wafer. As a result, the second-mentioned analyzer transmits a moving spot of light that is capable of systematically scanning a multicell output storage plate in a cell-by-cell (bit-by-bit) manner.

It is a feature of the present invention that an optical scanner comprise a Gunn-effect wafer biased by a direct-current source to generate high frequency propagating layers which selectively alter the polarization condition of an incident light beam transmitted therethrough, and that an analyzer be associated with the wafer for passing only that portion of the light whose polarization condition has been so altered, whereby the analyzer transmits a line of light that sweeps or scans an output plane at a uniform velocity.

It is another feature of this invention that two orthogonally-disposed Gunn-effect optical scanners, each energized only by a direct-current source, be combined in tandem to provide high-speed cell-by-cell interrogation of a multicell storage medium.

BRIEF DESCRIPTION OF THE DRAWING

A complete understanding of the present invention and of the above and other objects, features and advantages thereof may be gained from a consideration of the following detailed description of an illustrative embodiment thereof presented hereinbelow in connection with the accompanying drawing, in which.

DETAILED DESCRIPTION

Figure 1:
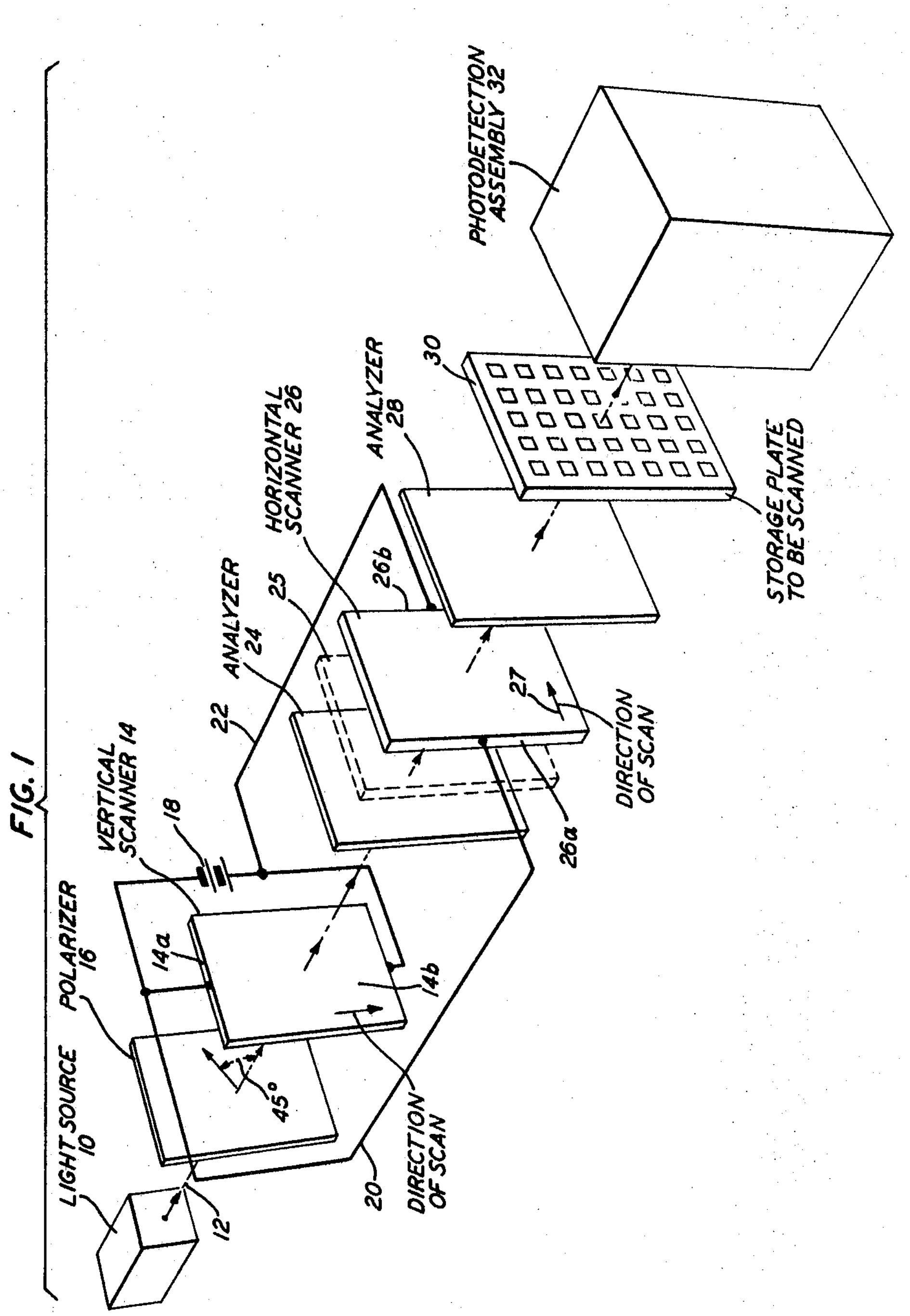
FIG. 1 shows an exploded view of a specific illustrative optical scanner made in accordance with the principles of the present invention.

The illustrative apparatus shown in FIG. 1 includes a light source 10 for supplying a beam of light whose direction of propagation is indicated by a vector 12. The output of the source 10 may if desired be coherent, but it need not be. In accordance with this invention the light that impinges on the left-hand or entry face of a vertical scanner element 14 is selected to be polarized at an angle of 45 degrees with respect to a plane that includes the top face 14*a* of the element 14. This polarization condition may be imposed on the light beam by a conventional polarizer element 16. Alternatively, the element 16 may be omitted and the source 10 adapted to provide an output beam polarized in the specified manner.

Advantageously, the beam that is directed at the entry face of the scanner element 14 is characterized by a rectangular cross-sectional area that is substantially coincident with the area of the entry face. (The output or exit face of the element 14 is designated 14*b*.) In this way substantially the entire entry face is illuminated with polarized light. The specified cross-section of the incident light may be provided by the source 10 itself or by a suitable mask (not shown) interposed between the source 10 and the element 14.

The element 14 shown in FIG. 1 comprises a wafer of bulk semiconductor material to which an electric field is applied by a direct-current voltage source 18. Leads 20 and 22 connect the source 18 to ohmic contacts made to top and bottom faces, respectively, of the element 14. Advantageously, these top and bottom faces constitute 111 faces of a gallium arsenide wafer element. Since the element 14 is designed to transmit light, it should be transparent or at least partially transparent to the incident radiation and have optically smooth entry and exit faces. In accordance with the principles of the present invention, the wafer 14 is made of a transparent semiconductor material which is appropriate for the establishment therein of Gunn-effect oscillations.

It is known that a thin wafer of certain semiconductors (for example, gallium arsenide, indium antimonide or indium phosphide) will produce microwave currents when direct-current electric fields of a few thousand volts per centimeter are applied thereto. Since the wafers employed in accordance with this invention are typically 0.01 centimeter in thickness (between electrodes), the applied direct-curent voltage need be only in the range of tens of volts. The build-up and decay times of the microwave oscillations generated within such a wafer constitute one period of oscillation. The oscillation frequency lies in the gigahertz range and is extremely stable.

The aforementioned oscillations are generated by the nucleation and propagation of a narrow dipole layer. This layer, which, for example, is typically in the order of 20 microns wide, is a combination of a layer of excess carrier density with an adjacent layer of deficient carrier density. The electric field between the layers is extremely large, constituting a field spike in the range of 10 to 100 kilovolts per centimeter. Once the dipole layer is fully developed near the cathode, it propagates to the anode of the wafer at approximately constant velocity. The next layer is not formed until the propagating layer has been collected at the anode.

The III–V compounds from which Gunn-effect oscillators are typically constructed exhibit a linear electro-optic effect. When an electric field is applied to such a material, the characteristic index ellipsoid thereof changes from a sphere to a spheroid or a gneeral ellipsoid. Thus, when a beam of light is passed through the material parallel to electrodes affixed thereto, the passage of the noted dipole layer momentarily changes the phase velocity of the light in a polarization-dependent way. In other words, the high field layers that successively traverse a Gunn-effect wafer exhibit unique indices of refraction relative to the remainder of the wafer material. As these layers propagate between the electrodes of the wafer, the polarization condition of a moving strip of the light transmitted through the wafer is altered in a selective way. Specifically, the narrow dipole layer sweeps the rectangular cross-section of the light beam and causes the polarization of the light that traverses the dipole layer to be translated to a state in which the electric vector is significantly displaced with respect to the aforenoted 45-degree polarization orientation of the incident beam. Advantageously, the electric vector is altered in transit through the dipole layer to an orientation at approximately right angles to the 45-degree polarization condition.

That portion of the light beam whose polarization condition is selectively altered during transit through the element 14 of FIG. 1, is passed or transmitted by a conventional analyzer element 24. The remainder of the light applied to the analyzer element 24, namely the portion thereof whose polarization remains disposed at 45 degrees, is blocked from appearing at the output or right-hand side of the element 24. Hence it is apparent that the element 24 transmits a moving ribbon of light whose thickness, velocity and period are determined by the corresponding characteristics of the dipole layers propagated within the scanner element 14.

As stated above, the dipole layers generated within a Gunn-effect wafer element propagate from cathode to anode thereof. Therefore, for the particular biasing connections shown in FIG. 1, the layers move from top to bottom in the element 14. As a result, the light ribbon transmitted by the analyzer element 24 also moves from top to bottom, hereby achieving a row-by-row vertical scan of a conventional storage plate and photodetector assembly 25 disposed in the path of the ribbon on the output side of the element 24. (In a row-by-row or "word" scanner, the number of photodetectors must equal the number of bits per word, i.e., the number of cells covered by the ribbon. On the other hand, the "cell" scanner to be described hereinbelow (two orthogonal ribbon scanners requires only a single photodetector.)

It is desirable that the thickness of the ribbon of light appearing at the output side of the analyzer element 24 not exceed the thickness of a dipole layer. To achieve this result, the distance between the entry and exit faces of the vertical scanner element 14 is selected to be sufficiently small that no appreciable dispersion of the light beam occurs during transit through the scanner element. Additionally, positioning the various elements shown in FIG. 1 in a compact contacting relationship, to reduce the longitudinal extent of the apparatus, will minimize beam-spreading effects. If the thickness of the ribbon transmitted by the analyzer element 24 is in practice determined to be excessively large, conventional cylindrical or spherical lenses can be positioned on the output side of the element 24 to refocus the ribbon to any desired cross-section.

In one specific illustrative apparatus encompassed within the principles of the present invention, the vertical scanner element 14 was dimensioned as follows:

(1) Thickness or distance between entry and exit faces—50 microns;

(2) Height or distance between face 14*a* and its parallel opposed face—140 microns; and (3) Width—100 microns.

For these dimensions and assuming as above a dipole layer thickness of about 20 microns, the number of resolvable positions or rows the light ribbon may assume is equal to seven. Thus the vertical element 14 and its associated analyzer element 24 are adapted to interrogate a seven-row 100-micron-by-140-micron optical storage plate.

The apparatus shown in FIG. 1 includes additional components for converting the aforedescribed row-by-row optical scanner into a cell-by-cell interrogation unit. (In the cell-by-cell unit the assembly 25 is omitted.) These additional components include a horizontal scanner element 26 which is essentially identical to the element 14. The only difference between the elements 14 and 26 is that ohmic contacts are made to opposed parallel front and back 111 faces 26*a* and 26*b* of the element 26 rather than to top and bottom faces thereof. In this way a horizontal movement of dipole layers (in the direction of arrow 27) is achieved within the element 26. Illustratively, the width of the element 26 (the distance between the faces *26a* and *26b*) is also 100 microns. Advantageously, the height and thickness of the element 26 are also identical to the corresponding dimensions of the element 14.

The electric vector of the moving light ribbon transmitted by the analyzer element 24 and directed at the entry or left-hand face of the horizontal scanner element 26 is advantageously disposed at 45 degrees with respect to a plane that includes the front face *26a* of the element 26. Exactly as in the previously described case of the vertical scanner element 14, the propagating dipole layers in the element 26 are effective to selectively alter the polarization condition of light propagated therethrough. Since the incident light ribbon and the dipole layers within the element 26 are moving in mutually perpendicular directions, it is evident that the polarization condition of a moving spot of light about 20 microns by 20 microns in area is altered in a selective way. This spot is defined at any instant of time by the overlap of the incident ribbon with the dipole layers within the element 26. Initially, because the vertical and horizontal scanner elements are energized simultaneously by being connected together in parallel to the direct-current bias source 18, the light spot whose polarization condition is selectively altered emanates from the upper left-hand corner of the exit or right-hand face of the element 26. An analyzer element 28 is positioned on the output side of the scanner element 26 and is adapted to pass only that portion of the light output of the element 26 whose polarization is altered in the manner described. Illustratively, the analyzer 28 is designed to pass only light polarized at approximately right angles to the noted polarization of the light incident on the element 26. In turn, the output of the analyzer 28 is directed at an optical storage plate 30 that contains an array of transparent and opaque spots indicative of stored binary information. A conventional photodetection assembly 32 is positioned on the output side of the plate 30 to monitor the transmissive nature of the interrogated spots.

Figure 2:
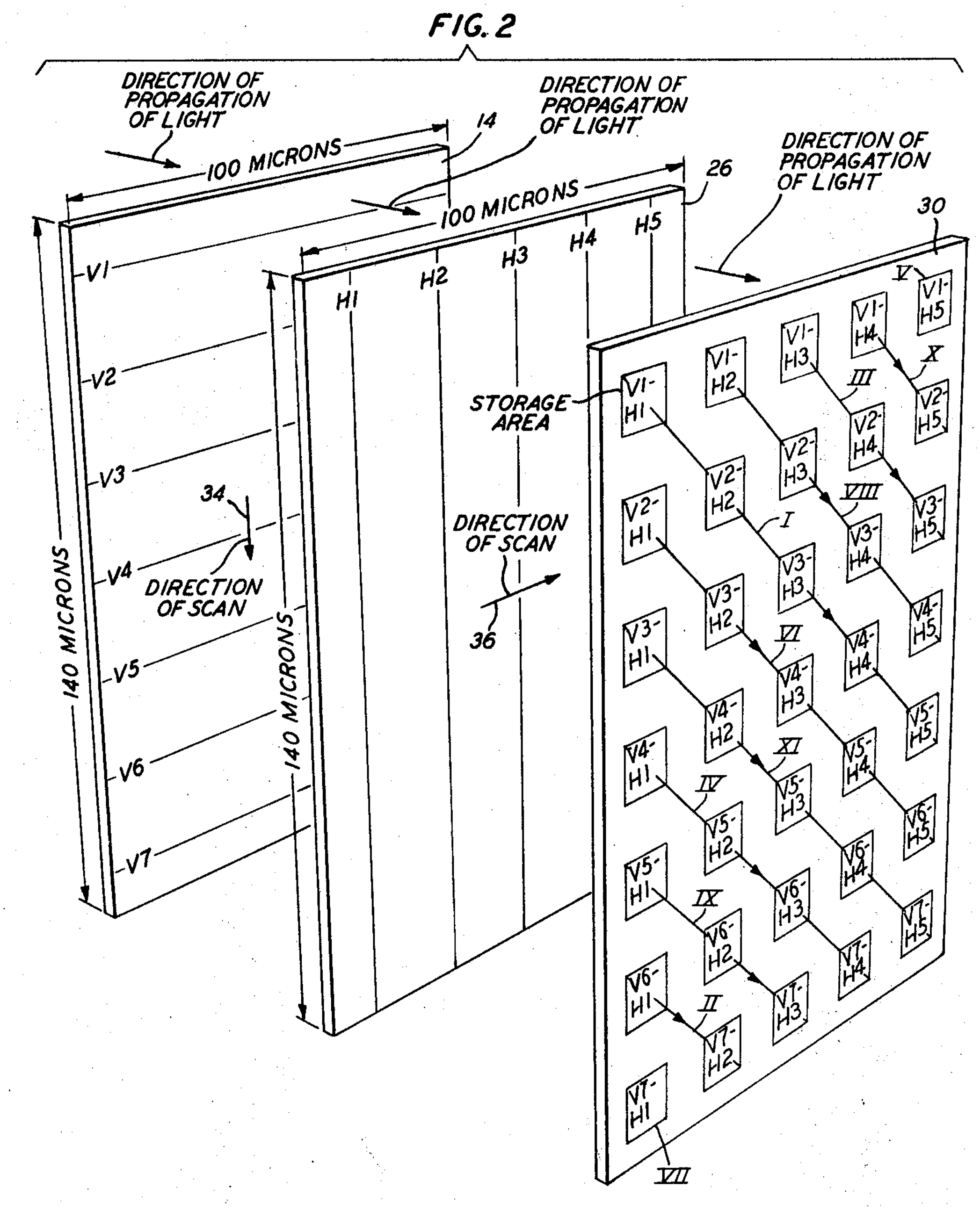
FIG. 2 depicts a portion of the apparatus of FIG. 1 and in particular illustrates the way in which a storage plate is scanned in a cell-by-cell manner in accordance with the invention.

FIG. 2 illustrates the specific manner in which a five-cell-by-seven cell storage plate 30 is scanned by the illustrative apparatus described above and shown in FIG. 1. The simplified arrangement of FIG. 2 includes elements 14 and 26 which respectively correspond to the previously-described vertical and horizontal scanners. (Elements such as the analyzers 24 and 28 have been omitted from FIG. 2 so as to not unduly clutter that depiction.) Assuming as above that the scanning apparatus is characterized by a 20 micron resolution element and assuming further that the units 14 and 26 are, for the sake of a particular illustrative example, dimensioned as shown in FIG. 2, let us consider the scanning pattern followed by the light spot emanating from the element 26 and directed at the plate 30. The scanning directions characteristic of the elements 14 and 26 are respectively indicated by the vectors 34 and 36. Accordingly, the upper left-hand storage area of the plate 30 is the first cell to be illuminated by the scanning light spot. This cell is in effect defined by the intersection of the propagating dipole layers within the elements 14 and 26. The respective positions of these layers within the elements 14 and 26 at the time that the noted cell is illuminated are diagrammatically represented in FIG. 2 by the lines V1 and H1. Hence the corresponding cell on the plate 30 is designated V1–H1.

Subsequently, the propagating dipole layers in the elements 14 and 26 cause the light spot directed at the plate 30 to follow a diagonal course. Specifically, the cells designated V2–H2, V3–H3, V4–H4 and V5–H5 are illuminated in sequence. The line designated I in FIG. 2 indicates this initial diagonal scanning direction. Next, because of the particular specified dimensioning of the elements 14 and 26, the layer in the scanner element 26 recommences another horizontal scanning cycle, while the layer in the scanner element 14 continues to move downward during its first vertical scanning cycle. Accordingly, the next intersection corresponding to a storage cell location occurs when the vertically-moving layer is at the location V6 and the horizontally-moving layer is at the location H1. Then the cell designated V7–H2 is illuminated. The scanning direction associated with these last two mentioned cells is represented in FIG. 2 by the line designated II.

By continuing to trace the relative movement of the propagating dipole layers in the manner described above, it is seen that the remaining cells of the storage plate 30 are scanned in sequence. The scanning sequence is indicated by the lines III through XI. (Actually V and VII are not lines, each referring to only a single cell.) The last cell interrogated in the diagonal scan designated XI is identified as V7–H5. Subsequent to the scanning of that cell the elements 14 and 26 simultaneously commence new scanning cycles, whereby the cell V1–H1 is again illuminated and another complete high-speed scanning of the five-by-seven matrix array is thereby initiated. In one specific illustrative embodiment made in accordance with the principles of the present invention, the scanning of such a 35-cell array required only 35 nanoseconds.

It is to be understood that the above-described arrangements are only illustrative of the application of the principles of the present invention. In accordance with these principles numerous other arrangements may be devised by those skilled in the art without departing from the spirit and scope of the invention.

What is claimed is:

1. In combination in an optical scanner, means for successively generating and propagating substantially constant-velocity narrow dipole layers characterized by unique indices of refraction, direct-current bias means connected to said first-mentioned means for activating said first-mentioned means to generate and propagate said layers, means for directing at said first-mentioned means a beam of radiant energy having a reference polarization condition and a cross-sectional area that is equal to the cross-sectional area of a multiplicity of said layers, and means for receiving and passing only that portion of said beam whose polarization condition is altered with respect to said reference condition by said propagating layers during transit of the beam through said first-mentioned means.

2. In combination, a wafer of a bulk semi-conductive material which is appropriate for the formation of Gunn-effect oscillations, bias means connected to opposed first and second faces of said wafer for establishing therein dipole layers of high electric field intensity which successively travel at a uniform velocity between said faces, opposed third and fourth faces on said wafer, said third and fourth faces bounding an optical path within said wafer suitable for propagating optical energy in a direction perpendicular to the direction of travel of said electric field layers, means for illuminating a substantial portion of said third face with an optical beam of a predetermined polarization, whereby said beam is swept by said traveling layers to cause the polarization condition of successive narrow line segments of said beam to be altered, a utilization device, and means positioned adjacent said fourth face for passing to said device only those segments of said beam whose polarization condition has been altered, whereby said device is scanned at a uniform velocity by said beam segments.

3. A combination as in claim 2 further including an additional Gunn-effect wafer interposed between said passing means and said utilization device in the path of said sweeping line segments for generating and propagating dipole layers in a direction perpendicular to the direction in which said segments sweep, whereby said line segments are swept by the propagating layers in said additional wafer to cause the polarization condition of successive spots defined by the intersection of said segments and said layers to be altered, means connecting said additional wafer to said bias means, and means interposed between said additional wafer and said utilization device for passing to said device only those spots of said segments whose polarization condition has been altered in transit through said additional wafer.

4. In combination, means for generating a beam of radiant energy having a specified polarization condition, first and second means disposed in tandem in the path of said beam, for successively generating and propagating substantially constant-velocity dipole layers characterized by unique indices of refraction, said first and second means being oriented such that the respective layers propagated therein travel in mutually perpendicular directions each perpendicular to the direction of travel of said beam, and direct-current bias means for simultaneously activating said first and second means to generate and propagate said layers.

5. A combination as in claim 4 further including means interposed between said first and second means in the path of said beam for passing to said second means only that portion of the incident radiant energy whose polarization condition is selectively altered during transit through said first means by interaction with the propagating layers in said first means.

6. A combination as in claim 5 still further including means disposed to receive the radiant energy transmitted through said second means and for passing to an output storage unit to be scanned only that portion of the received radiant energy whose polarization condition is selectively altered during transit through said second means by interaction with the propagating layers in said second means, and a photodetection device adapted to detect any radiant energy transmitted through said unit.

References Cited

UNITED STATES PATENTS 3,027,806 4/1962 Koelsch et al. ______ 250—225 X

OTHER REFERENCES

McDonnell, J. A., "Optical Sweep and Recording System," IBM Tech. Disclosure Bulletin, v. 9, No. 8, January 1967 pp. 1002–1003.

Smith, A. W., "Gigabit Binary Optical Data Link," IBM Tech. Disclosure Bulletin, v. 9, No. 8, January 1967 pp. 1004–1005.

ROBERT SEGAL, Primary Examiner

D. O'REILLY, Assistant Examiner

U.S. Cl. X.R.

250—226; 350—150; 315—169